United States Patent
Herbiet et al.

(10) Patent No.: US 6,808,809 B2
(45) Date of Patent: Oct. 26, 2004

(54) METHOD FOR PRODUCING FILLERS HAVING IMPROVED BULK MATERIAL STABILITY AND POURABILITY

(75) Inventors: René Herbiet, Eupen (BE); Mario Neuenhaus, Elsdorf (DE)

(73) Assignee: Albemarle Corporation, Baton Rouge, LA (US)

( * ) Notice: Subject to any disclaimer, the term of this patent is extended or adjusted under 35 U.S.C. 154(b) by 66 days.

(21) Appl. No.: 10/257,116

(22) PCT Filed: Apr. 9, 2001

(86) PCT No.: PCT/EP01/04039

§ 371 (c)(1),
(2), (4) Date: Oct. 8, 2002

(87) PCT Pub. No.: WO01/77218

PCT Pub. Date: Oct. 18, 2001

(65) Prior Publication Data

US 2003/0158315 A1 Aug. 21, 2003

(30) Foreign Application Priority Data

Apr. 10, 2000 (DE) ............................................ 00107713

(51) Int. Cl.⁷ ............................... B32B 5/16; B05D 1/12
(52) U.S. Cl. ...................... 428/407; 427/212; 427/215; 427/221; 427/421
(58) Field of Search ................................ 427/212, 215, 427/221, 421; 428/407

(56) References Cited

U.S. PATENT DOCUMENTS

| | | | | |
|---|---|---|---|---|
| 4,764,544 A | * | 8/1988 | Carey et al. | 523/205 |
| 4,876,291 A | * | 10/1989 | Dallavia et al. | 521/124 |
| 5,017,630 A | * | 5/1991 | Raines et al. | 523/334 |
| 5,139,875 A | * | 8/1992 | Metzemacher et al. | 428/403 |
| 5,955,516 A | * | 9/1999 | Caswell et al. | 523/203 |

FOREIGN PATENT DOCUMENTS

| | | |
|---|---|---|
| DE | 4417833 | 11/1994 |
| EP | 0077055 | 4/1983 |
| EP | 0359362 | 3/1990 |
| EP | 0628609 | 12/1994 |
| JP | 50075230 | 6/1975 |

* cited by examiner

*Primary Examiner*—H. Thi Le
(74) *Attorney, Agent, or Firm*—Jeffrey S. Melcher; Manelli Denison & Selter, PLLC

(57) ABSTRACT

Disclosed is a method for producing surface-modified fillers by spray-drying an aqueous suspension of a filler that consists of fine particles, whereby 0.1 to 50 wt. % (calculated as dry substance), preferably 0.3 up to less than 1 wt %, of an aqueous dispersion of a thermoplastic polymer or copolymer or a caoutchouc are added. Said fillers have improved bulk material stability and improved pourability. The inventive fillers are particularly suitable as flame-retardant fillers for synthetic materials or rubber, in a cable insulation for instance.

19 Claims, No Drawings

METHOD FOR PRODUCING FILLERS HAVING IMPROVED BULK MATERIAL STABILITY AND POURABILITY

The invention relates to a process for the preparation of fine-particle fillers, in particular those with flame-retardant action such as aluminium hydroxide or magnesium hydroxide, with improved free-flowability and improved bulk density behaviour, in particular after pneumatic conveyance through pipes, as well as polymer-coated fillers obtainable according to this process and their use as flame-retardant fillers in plastic or rubber compounds.

Fine-particle precipitated or also ground fillers often display a poor free-flowability. This impairs the flowability of the products, e.g. in compounding units or in those conveyance processes in which a good flow of the product is an essential criterion (e.g. silo discharge, flow in the internal mixer, etc.).

Although an improved free-flowability is achieved by adding dispersing agents customary in the trade, the products thus obtained generally have an electrical conductivity that is much too great for cable insulation applications.

A further disadvantage of these products is that after a conveyance process (e.g. through freefall or by means of air through a pipe) the bulk density sinks to a very low level. As a result, the compounding behaviour worsens at the same time in all current mixing units.

A further aspect is that the trend on the market is towards batch delivery. This means that even after a transport process, for example from the manufacturer's silo to the silo vehicle and from there into the customer's silo with subsequent conveyance into the service hopper, a high bulk density combined with good free-flowability is desirable.

Further important limiting conditions are that the properties of the plastic or rubber compounds prepared with these products must be unimpaired or only slightly impaired. These include in particular:

- the rheological properties of the compounds
- the mechanical properties of the compounds
- the flame protection, where flame-retardant fillers are involved
- the electrical properties of the compounds, in particular after ageing in water
- silane-coupling to the filler, here primarily amino and vinyl silanes
- the freedom from hard filler agglomerates With regard to freedom from agglomerates, although agglomerates may be present in the filler, they must dissolve completely in the plastic during the compounding process.

In addition, the additive must not lead to a reduction in the throughput during filler production, for example during the spray-drying (e.g. because of a reduction in the solids content in the slurry or an increase in the viscosity of the slurry).

Furthermore an increased moisture affinity of the coated product is to be ruled out because this leads, e.g. in electrical insulation materials, to blister formation and thus among other things to a reduced dielectric strength.

The object of the invention was therefore to prepare fine-particle flame-retardant fillers which have a good free-flowability, display a high bulk density even after pneumatic conveyance, can be worked well into plastic compounds and the typical properties of which, in particular when used in cable compounds, are not disadvantageously influenced.

According to the invention, this object is achieved by a process for the preparation of surface modified fillers with improved bulk density stability, improved free-flowability and an average agglomerate size from 1 to 500 $\mu$m. In this process an aqueous suspension of filler with a primary particle size in the $d_{50}$-value of not more than 15 $\mu$m with addition of 0.1 to 50 wt.-% (calculated as dry substance) of an aqueous polymer dispersion is spray-dried. The aqueous polymer dispersion consists of at least one thermoplastic polymer or copolymer and/or one rubber and optionally at least one self-crosslinking polymer or copolymer, dispersing agent and water.

It was found that by adding 0.1 to 50 wt.-%, preferably 0.3 to less than 1 wt. %, suitable additives to an aqueous filler suspension and then spray-drying, the desired properties can be achieved. The quantities given relate in each case to the dry substance, i.e. the filler on the one hand and the polymers or copolymers on the other. By suitable additives are meant according to the invention aqueous polymer or copolymer emulsions, at least one thermoplastic polymer or copolymer or a rubber (latex) or a mixture of several of the named polymeric substances being present.

It is surprising in particular that quantities of less than 1.0 wt.-% of the named polymers are already sufficient to achieve the effect according to the invention.

The polymer dispersions usually contain an emulsifier for the aqueous phase, anionic, cationic or also neutral emulsifiers being able to be used.

Natural or synthetic substances such as for example calcium carbonate, dolomite, barium sulphate, talc, china clay, mica, wollastonite, silicon dioxide (silica, silicic acid), aluminium oxide, magnesium oxide, aluminium hydroxide and magnesium hydroxide can be used as fillers.

Usable as thermoplastic polymers are for example styrene copolymers such as e.g. styrene/acrylonitrile copolymers (SAN) or SAN modifications such as e.g. acrylonitrile/polybutadiene/styrene graft polymers, or graft copolymers based on methyl methacrylate or polyacrylates such as e.g. acrylonitrile copolymers or graft copolymers of polymethyl methacrylate with polybutadiene. Copolymers of vinyl chloride and vinylidene chloride/acrylonitrile are also suitable.

Polyvinyl alcohol (PVOH) and also polyvinyl acetate (PVA) are preferred.

Also preferred are polymerized esters or copolymerized esters of acrylic acid with low alcohols, in particular those with $C_{1-6}$ alcohols such as methyl acrylate, ethyl acrylate or butyl acrylate. These also include for example ethylene/ethyl acrylate copolymers (EEA), ethylene/methyl acrylate copolymers (EMA) and ethylene/butyl acrylate copolymers (EBA).

Polyethylene or copolymers of ethylene are also preferably used. Examples are: ethylene/vinyl chloride graft copolymers such as ethylene/vinyl chloride/vinyl acetate (EVCVA) and ethylene/acrylic acid copolymers (EAA).

Ethylene/vinyl acetate copolymers (EVA) and ethylene/vinyl alcohol copolymers (EVOH) are particularly preferred.

In a likewise preferred version, the polymer dispersion contains at least one self-cross-linking polymer or copolymer.

The polymer dispersions used according to the invention can be added for example in metered doses together with a dispersing agent required for the formation of the filler suspension. To prepare the filler suspension, e.g. the ground dry filler is liquefied with water and the dispersing agent, or in the case of synthetic (precipitated) fillers, the moist filler obtained after precipitation and filtration is used.

The spray-drying is advantageously carried out [with] a suspension the filler content of which is between 10 and 90 wt.-%, preferably between 40 and 65 wt.-%. Spray dryers customary in the trade can be used as can be obtained for example from Niro. Air is preferably used as desiccant gas, the quantity and entry temperature of which is advantageously such that an exit temperature of 100–150° C. results.

The process according to the invention is particularly preferably used for the preparation of fillers based on aluminium and/or magnesium hydroxides. Both single hydroxides such as $Al(OH)_3$, AlOOH and $Mg(OH)_2$, and physical mixtures of these hydroxides or mixed hydroxides such as hydrotalcite or similar compounds can also be used.

A further particularly preferred filler is calcium carbonate.

A product with a primary particle size (given as $d_{50}$ value) of not more than 15 μm, preferably not more than 5 μm, is advantageously used as filler. The free-flowable product, improved in respect of bulk density behaviour, i.e. conveyance-stable, which can be prepared from same according to the invention has an average agglomerate size of 1 to 500 μm, preferably 20 to 200 μm, and, according to the quantity of polymer dispersion used, a coating with 0.1 to 50 wt.-%, preferably 0.3 to less than 1 wt.-% of a polymer and/or copolymer.

The free-flowable fillers according to the invention are preferably used in a quantity of 5 to 90 wt.-% (relative to the overall weight of the compound) as flame-retardant fillers in plastic or rubber compounds, in particular in cable mixtures.

The following examples with aluminium hydroxide of different primary particle sizes illustrate the performance of the invention without being regarded as limiting it in any way.

The aluminium hydroxide used in the examples as starting materials had the properties summarized in the following Table 1:

TABLE 1

| Type | Particle size ($d_{50}$) [μm] | Spec. surface (BET) [m²/g] |
|---|---|---|
| OL-104/LE | 1.3–2.3 | 3–5 |
| OL-107/LE | 0.9–1.5 | 6–8 |
| SF4 ESD | 1.96 | 4.5 |

Types OL-104/LE and OL-107/LE are products of Alusuisse Martinswerk Gmbh, Bergheim/Erft, Germany. SF4 ESD is an Alcan product. All types were used as product customary in the trade.

The mixing ratios of the compounds are given in the customary phr unit (1 phr=1 part by weight per 100 parts by weight polymer).

EXAMPLE 1

Influence on Electrical Conductivity in Water and Viscosity of the Slurry

The influence of the additives according to the invention on electrical conductivity and viscosity were examined (Brookfield viscometer, 100 rpm, spindle 3). To this end, 0.5 wt.-% or 1.0 wt.-% polymer active ingredient, relative to aluminium hydroxide, were added to an aqueous slurry with 55 wt. % aluminium hydroxide (type OL-104/LE) and the viscosity then measured. For problem-free further processing, the viscosity should be below 200 mPa·s as far as possible.

Electrical conductivity was measured in the same suspension which was diluted for this purpose to 10% solids content by means of distilled water. To obtain good electrical properties of the products, the conductivity should be below 150 μS/cm as far as possible. The results are summarized in the following Table 2.

TABLE 2

| Additive | Polymer type | Active ingredient [%] | Conductivity [μS/cm] | Viscosity [mPa·s] |
|---|---|---|---|---|
| 1 | Polyvinyl alcohol PAF 60[1) | 0.5 | 51 | 58 |
|   |   | 1.0 | 54 | 58 |
| 2 | Polyvinyl alcohol PAF 2[1) | 0.5 | 51 | 58 |
|   |   | 1.0 | 57 | 56 |
| 3 | Ethylene/vinyl acetate copolymer Vinamul ® 3242[2) | 0.5 | 81 | 47 |
|   |   | 1.0 | 110 | 47 |
| 4 | Self-cross-linking ethylene/vinyl chloride/vinyl acetate copolymer Vinamul ® 3479[2) | 0.5 | 93 | 57 |
|   |   | 1.0 | 124 | 55 |
| 5 | Ethylene/vinyl chloride/vinyl acetate/acrylate copolymer Vinamul ® 3650[2) | 0.5 | 75 | 40 |
|   |   | 1.0 | 75 | 22 |
| 6 | Polyvinyl acetate Vinamul ® 9300[2) | 0.5 | 76 | 45 |
|   |   | 1.0 | 86 | 53 |
| 7 | Self-cross-linking polyacrylate Vinacryl ® 4345[2) | 0.5 | 71 | 44 |
|   |   | 1.0 | 76 | 41 |

[1)Manufacturer: Zschimmer & Schwarz, Lahnstein, DE.
[2)Manufacturer: Vinamul B. V., Geleen, NL.
It will be seen that the additives observe the desired values.

EXAMPLE 2

Influence on Conveyance Behaviour and Free-flowability

Selected additives were sprayed with a suspension of 55 wt.-% aluminium hydroxide (OL-104/LE) and an active ingredient content of 0.5 wt.-%, relative to the aluminium hydroxide, on a semi-scale plant spray dryer (Niro Atomizer, "Production Minor" type). A dispersing agent (e.g. acetic acid) was used and the additives stirred in as aqueous dispersion. The throughput of the spray dryer was approx. 10 kg/h solids, the air-supply temperature approx. 500° C. and the waste-air temperature 120–130° C. Before and after a conveyance process, the bulk density, on a litre scale ("litre weight"), and the free-flowability, quantified by the flow time, of the spray-dried product were measured by means of suction air (25 m pipe, Ø=40 mm, with 9 bends each of 90°). To measure the litre weight a cylindrical measuring vessel with a diameter of 110 mm and a volume of 1 l was filled to the brim and the net weight measured. The flow time was measured as the throughflow time of 100 g filler through a polished frustrum-shaped brass funnel with a height of 115 mm, an upper diameter of 145 mm and an outflow diameter of 16 mm. The funnel is vibrated by a mechanical oscillator of defined frequency and amplitude. An AS 200 type control screening machine from Retsch served for the following tests. The frequency was fixed in advance by the design, the amplitude was 1.5 mm. The results are summarized in the following Table 3. In each case the litre weight is given and the flow time before and after the conveyance compared with the untreated products OL-104/LE and SF4 ESD. The types and manufacturers of the additives are the same as in Table 2.

TABLE 3

| Additive | Polymer type | Liter weight before conveyance [g/l] | Liter weight after conveyance [g/l] | Flow time before conveyance [s] | Flow time after conveyance [s] |
|---|---|---|---|---|---|
| — | — | 570 | 362 | 11 | 20 |
| —* | — | 515 | 327 | 8 | 14 |
| 1 | Polyvinyl alcohol | 624 | 564 | 11 | 9 |
| 2 | Polyvinyl alcohol | 640 | 515 | 9 | 10 |
| 3 | Ethylene/vinyl acetate copolymer | 543 | 433 | 9 | 13 |
| 4 | Self-cross-linking ethylene/vinyl chloride/vinyl acetate copolymer | 650 | 468 | 14 | 10 |
| 5 | Ethylene/Vinyl chloride/vinyl acetate/acrylate copolymer | 500 | 419 | 7 | 9 |
| 6 | Polyvinyl acetate | 507 | 416 | 8 | 11 |
| 7 | Self-cross-linking acrylate | 613 | 492 | 13 | 8 |

*Aluminium hydroxide type SF4 ESD

Through the conveyance process, the litre weight of the OL-104/LE decreases from 570 g/l to 362 g/l and that of the SF4 ESD from 515 g/l to 327 g/l, i.e. in each case by approximately 36%.

The increase, i.e. the worsening of the flow time of OL-104/LE from 11 s to 20 s, is also clear. Although the product SF4 ESD has shorter flow times in absolute terms, the relative increase after conveyance is approximately the same. On the other hand, the products according to the invention simultaneously display an improved flow behaviour and a clearly smaller decrease in the litre weight through the conveyance. The smallest decrease (approx. −10%) was obtained with additive 1, the largest (approx. −28%) with additive 4, in each case however it was clearly smaller than with the reference products not according to the invention. In the case of the products according to the invention, a decrease in the flow time was even observed after the conveyance process with additives 1, 4 and 7. This flow improvement through the conveyance process appears paradoxical, but can be explained by a reduction in the "adhesive effect" by the polymer during conveyance.

EXAMPLE 3

Influence on the Conveyance Behaviour and Free-flowability

The procedure was as described in Example 2, however instead of aluminium hydroxide OL-104/LE, the finer-particle grade OL-107/LE was used as filler starting material. In addition to the two polyvinyl alcohol types from Examples 1 and 2, four self-cross-linking polyacrylates from Vinamul were used as additives. The results are summarized in the following Table 4.

TABLE 4

| Additive | Polymer type | Liter weight before conveyance [g/l] | Liter weight after conveyance [g/l] | Flow time before conveyance [s] | Flow time after conveyance [s] |
|---|---|---|---|---|---|
| — | — | 389 | 282 | 13 | 23 |
| 1 | Polyvinyl alcohol PAF 60 | 489 | 473 | 9 | 10 |
| 2 | Polyvinyl alcohol PAF 2 | 498 | 460 | 9 | 12 |
| 7 | Self-cross-linking acrylate Vinacryl ® 4345 | 445 | 426 | 10 | 9 |
| 8 | Self-cross-linking acrylate | 495 | 408 | 15 | 9 |

TABLE 4-continued

| Additive | Polymer type | Liter weight before conveyance [g/l] | Liter weight after conveyance [g/l] | Flow time before conveyance [s] | Flow time after conveyance [s] |
|---|---|---|---|---|---|
| 9 | Vinacryl® 4343 Self-cross-linking acrylate Vinacryl® 4344 | 460 | 443 | 9 | 9 |
| 10 | Self-cross-linking acrylate Vinacryl® 4373 | 334 | 306 | 8 | 13 |

EXAMPLE 4
Influence on the Physical Properties of Compounds Without and With Silane To examine the influence of the coating according to the invention on the rheological, mechanical and electrical properties, the flame protection and the silane coupling, the 4 additives no. 1, no. 2, no. 4 and no. 7 were selected for further tests. Melt Flow Index (MFI) in accordance with DIN-ISO 1133, tensile strength $\sigma_B$ and elongation at break $\epsilon_B$ in accordance with DIN 53504 and EN ISO 527, specific resistance p after storage in water for 7 d at 70° C. or 28 d at 50° C. in accordance with DIN 53482/VDE 0303 Part 3 and Limiting Oxygen Index (LOI) in accordance with ASTM D2863 were measured. Tables 5 and 6 show the results compared with the uncoated OL-194/LE and SF4 ESD in an EVA compound containing 19% vinyl acetate (polymer=100 phr), 150 phr filler quantity, 1.5 phr (3-aminopropyl)triethoxy silane, which was added during the compounding process on a rolling mill, and 0.75 phr Irganox® 1010.

TABLE 5

(without silane)

| Additive | MFI (190° C./10 kg [g/10 min] | $\sigma_B$ [Mpa] | $\epsilon_B$ [%] | $\rho$ 7 d/70° C. [$\Omega \cdot$ cm] | $\rho$ 28 d/50° C. [$\Omega \cdot$ cm] | LOI (50 × 2 mm$^2$) [% O$_2$] |
|---|---|---|---|---|---|---|
| — | 1.24 | 8.8 | 119 | $2.9 \cdot 10^8$ | $2.2 \cdot 10^8$ | 38 |
| —*) | 1.41 | 9.2 | 114 | — | $5.2 \cdot 10^7$ | 38 |
| 1 | 1.72 | 7.8 | 140 | $5.3 \cdot 10^9$ | $1.9 \cdot 10^8$ | 37.6 |
| 2 | 1.92 | 8.5 | 135 | $4.0 \cdot 10^9$ | $9.4 \cdot 10^7$ | 37.8 |
| 4 | 1.52 | 8.7 | 147 | $3.5 \cdot 10^9$ | $9.0 \cdot 10^8$ | 37.4 |
| 7 | 1.52 | 9.3 | 170 | $4.6 \cdot 10^8$ | $1.3 \cdot 10^9$ | 37.4 |

*)Aluminium hydroxide type SF4 ESD

TABLE 6

(with silane)

| Additive | MFI (190° C./10 kg) [g/10 min] | $\sigma_B$ [Mpa] | $\epsilon_B$ [%] | $\rho$ 28 d/50° C. [$\Omega \cdot$ cm] |
|---|---|---|---|---|
| — | 0.9 | 11.6 | 205 | $1.9 \cdot 10^{14}$ |
| —*) | 1.1 | 11.6 | 197 | $2.9 \cdot 10^{14}$ |
| 1 | 1.4 | 11.6 | 197 | $1.8 \cdot 10^{13}$ |
| 2 | 1.5 | 11.6 | 202 | $1.8 \cdot 10^{14}$ |
| 4 | 1.3 | 11.4 | 208 | $1.5 \cdot 10^{13}$ |
| 7 | 1.2 | 11.5 | 210 | $3.5 \cdot 10^{14}$ |

*)Aluminium hydroxide type SF4 ESD

Table 5 shows that the melt flow index (MFI) is slightly improved by the process according to the invention. Without aminosilane, the tensile strength is not significantly changed with the exception of additive no. 1. The elongation at break on the other hand is significantly improved. The electrical properties after 7 d/70° C. or 28 d/50° C. are the same as or even better than for untreated OL-104/LE and always better than for the comparison product SF4 ESD.

Table 6 also shows that the MFI is slightly improved compared with OL-104/LE and SF4 ESD. The observed mechanical properties prove that the silane coupling is apparently not impaired. Even after ageing in water, very high specific resistance values of $10^{13}$ to $10^{14}$ $\Omega \cdot$cm are obtained.

EXAMPLE 5
Influence on the Mechanical Compound Properties in a Cross-linkable EVA Formulation with Vinyl Silane Compounds were prepared according to the following formulation:

100 phr EVA (vinyl acetate content 19%)
150 phr aluminium hydroxide
1.5 phr vinyltrimethoxysilane
2.5 phr Perkadox® 14/40 peroxide
0.75 phr Irganox® 1010.

Aluminium hydroxide, or OL-107/LE, untreated or treated according to the invention as per Example 2, was used as aluminium hydroxide. The vinyl silane was added during the compounding on the rolling mill. The compounds were cross-linked for 20 min at 175° C. Tensile strength $\sigma_B$ and elongation at break $\epsilon_B$ were then measured. The results are summarized in the following Table 7.

TABLE 7

| Additive | $\sigma_B$ [Mpa] | $\epsilon_B$ [%] |
|---|---|---|
| — | 18.3 | 193 |
| 1 | 18.1 | 163 |
| 2 | 18.5 | 178 |
| 7 | 19.4 | 198 |
| 8 | 17.9 | 207 |

According to Table 7, the measured values show only small changes compared with the uncoated product, and these either lie in the measurement value spread range or can be optimized by adjustment of the silane/peroxide quantity.

What is claimed is:

1. Process for the preparation of surface modified fillers with improved bulk density stability, improved free-flowability and an average agglomerate size from 1 to 500 μm, characterized in that an aqueous suspension of filler with a primary particle size in the $d_{50}$-value of not more than 15 μm with addition of 0.1 to 50 wt.-% (calculated as dry substance) of an aqueous polymer dispersion is spray-dried, which aqueous polymer dispersion consists of at least one thermoplastic polymer or copolymer and/or one rubber and optionally at least one self-crosslinking polymer or copolymer, dispersing agent and water.

2. Process according to claim 1 characterized in that the polymer dispersion is added in a quantity (calculated as dry substance) of 0.3 to less than 1.0 wt.-%.

3. Process according to claim 1, characterized in that the polymer dispersion contains polyvinyl alcohol.

4. Process according to claim 1, characterized in that the polymer dispersion contains polyvinyl acetate.

5. Process according to claim 1, characterized in that the polymer dispersion contains at least one polymerized or copolymerized ester of acrylic acid with at least one $C_{1-6}$ alcohol.

6. Process according to claim 5, characterized in that the polymerized or copolymerized ester of acrylic acid is butyl acrylate.

7. Process according to claim 1, characterized in that the polymer dispersion contains polyethylene or a copolymer of ethylene.

8. Process according to claim 7, characterized in that the polymer dispersion contains an ethylene/vinyl acetate copolymer.

9. Process according to claim 7, characterized in that the polymer dispersion contain ethylene/vinyl alcohol copolymer.

10. Process according to 1, characterized in that the polymer dispersion contains at least one self-crosslinking polymer or copolymer.

11. Process according to claim 1, characterized in that the spray-drying is carried out with a filler content of 10 to 90 wt.-%.

12. Process according to claim 11, characterized in that the spray-drying is carried out with a filler content of 40 to 65 wt.-%.

13. Process according to claim 1, characterized in that one or more hydroxides of aluminium and/or magnesium are used as filler.

14. Process according to claim 1, characterized in that calcium carbonate is used as filler.

15. Free-flowable fillers with a primary particle size in the $d_{50}$ value of not more than 15 μm, an average agglomerate size of 1 to 500 μm, and a coating with 0.1 to 50 wt.-% of polymer or copolymer, which consists at least of one thermoplastic polymer or copolymer and/or one rubber, and optionally at least one self-crosslinking polymer or copolymer, dispersing agent and water, obtainable by the process according to claim 1.

16. Free-flowable fillers according to claim 15, characterized in that they carry a coating of 0.3 to less than 1.0 wt.-% of polymer or copolymer.

17. Use of free-flowable fillers according to claim 15 as flame retardant fillers in a quantity of 5 to 90 wt. % in plastic or rubber compound.

18. Use of free-flowable fillers according to claim 15 as flame retardant fillers in a quantity of 5 to 90 wt. % in mixtures for cable insulations.

19. Free-flowable fillers with a primary particle size in the $d_{50}$ value of not more than 5 μm, an average agglomerate size of 20 to 200 μm, and a coating with 0.1 to 50 wt.-% of polymer or copolymer, which consists at least of one thermoplastic polymer or copolymer and/or one rubber, and optionally at least one self-crosslinking polymer or copolymer, dispersing agent and water, obtainable by the process according to claim 1.

* * * * *